(12) United States Patent
Wan et al.

(10) Patent No.: US 11,895,436 B2
(45) Date of Patent: Feb. 6, 2024

(54) DEVICE COMPRISING A DISPLAY AND A CAMERA ON THE SAME OPTICAL AXIS

(71) Applicant: Google LLC, Mountain View, CA (US)

(72) Inventors: Chung Chun Wan, San Jose, CA (US); Ping Tong Chu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 40 days.

(21) Appl. No.: 17/610,901

(22) PCT Filed: May 16, 2019

(86) PCT No.: PCT/US2019/032716
§ 371 (c)(1),
(2) Date: Nov. 12, 2021

(87) PCT Pub. No.: WO2020/231445
PCT Pub. Date: Nov. 19, 2020

(65) Prior Publication Data
US 2022/0210369 A1   Jun. 30, 2022

(51) Int. Cl.
*H04N 7/14*   (2006.01)
(52) U.S. Cl.
CPC .................................... *H04N 7/144* (2013.01)
(58) Field of Classification Search
CPC .. H04N 7/144; H04N 5/23293; H04N 5/3696; H04N 7/14
USPC ...................... 348/14.16, 47, 153, 174, 227.1
See application file for complete search history.

(56) References Cited

U.S. PATENT DOCUMENTS

| 2008/0106628 A1 | 5/2008 | Cok et al. |
| 2008/0165267 A1 | 7/2008 | Cok |
| 2012/0099062 A1* | 4/2012 | Chen ................. G02F 1/133377 349/115 |
| 2015/0213768 A1 | 7/2015 | Jung |
| 2016/0217750 A1 | 7/2016 | Lee et al. |
| 2017/0123453 A1 | 5/2017 | Evans et al. |

FOREIGN PATENT DOCUMENTS

KR   10-2012-0058613   6/2012

OTHER PUBLICATIONS

Office Action in Korean Appln. No. 10-2021-7033180, dated Feb. 21, 2023, 9 pages (with English Translation).
PCT International Search Report and Written Opinion in International Appln. No. PCT/US2019/032716, dated Dec. 17, 2019, 15 pages.
PCT International Preliminary Report on Patentability in International Appln. No. PCT/US2019/032716, dated Nov. 25, 2021, 8 pages.
Notice of Allowance in Korean Appln. No. 10-2021-7033180, dated Jul. 7, 2023, 3 pages.

* cited by examiner

*Primary Examiner* — Yosef K Laekemariam
(74) *Attorney, Agent, or Firm* — Fish & Richardson P.C.

(57) ABSTRACT

A device (100) includes a display (110) itself including pixel groups. A bottom and sides of each of the pixel groups are covered with non-reflective material. The pixel groups are electrically coupled together with transparent conductive interconnections. A camera (122) is located beneath the display and the camera is configured to sense light that passes through the display.

17 Claims, 4 Drawing Sheets

DEVICE COMPRISING A DISPLAY AND A CAMERA ON THE SAME OPTICAL AXIS

CROSS-REFERENCES TO RELATED APPLICATIONS

This application is a National Stage application, filed under 35 U.S.C. 371 and claims the benefit of International Patent Application No. PCT/US2019/032716 filed on May 16, 2019, the entirety of which is incorporated by reference herein.

BACKGROUND

Electronic devices include those with both cameras and displays. In some of those electronic devices, the cameras are placed underneath the displays.

SUMMARY

This document describes techniques, methods, systems, and other mechanisms for reducing image quality degradation caused by a display over a camera. Placing a camera under a display may be highly desired for many consumer electronics. For example, a camera behind a display may allow for a full screen display on an electronic device like a smartphone, laptop, tablet, TV.

However, the image quality from a camera behind a display may be negatively impacted significantly due to the display's structure. Some major problems caused by the display's structure on image quality from a camera may include light diffraction, light reflection, and transmission loss. All of these issues may translate to image resolution reduction, haze, ghost image, image signal to noise ratio reduction, and flare.

A device may reduce light reflections through covering a bottom and sides of pixel groups with non-reflective material and coupling pixels with transparent conductive interconnections. Covering the bottom and sides of pixel groups with non-reflective material may avoid light reflections off pixels and using transparent conductive interconnections may avoid light reflections off metal interconnections. Coupling pixels with transparent conductive interconnections may also reduce light diffraction caused by the interconnections.

Additionally or alternatively, the device may reduce image quality degradation by reducing transmission loss. For example, the device may reduce pixel density over a small local region of the display above the camera to increase an effective camera aperture size.

One innovative aspect of the subject matter described in this specification is embodied in a device that includes a display that includes pixel groups, where a bottom and sides of each of the pixel groups are covered with non-reflective material, where the pixel groups are electrically coupled together with transparent conductive interconnections and a camera located beneath the display, where the camera is configured to sense light that passes through the display. Other embodiments of this aspect include a corresponding display that includes pixel groups, where a bottom and sides of each of the pixel groups are covered with non-reflective material, where the pixel groups are electrically coupled together with transparent conductive interconnections.

The foregoing and other embodiments can each optionally include one or more of the following features, alone or in combination. For instance, in some aspects the sides of each of the pixel groups that extend in a vertical direction from the bottom are entirely covered with the non-reflective material. In certain aspects, each of the pixel groups includes four sides that extend in the vertical direction. In some implementations, the non-reflective material is colored black. In some aspects, the non-reflective material absorbs at least 80% of light incident on the non-reflective material.

In certain aspects, the interconnections are arranged such that rows of the pixel groups alternate between including interconnections that extend in a horizontal direction and not including interconnections that extend in a horizontal direction. In some implementations, the interconnections are arranged such that columns of the pixel groups alternate between including interconnections that extend in a vertical direction and not including interconnections that extend in a vertical direction.

In some aspects, the interconnections are arranged such that pixel groups in a row without interconnections that extend in the horizontal direction are electrically coupled together by interconnections that extend in a vertical direction from pixel groups in rows with interconnections that extend in the horizontal direction to the pixel groups in the row without interconnections that extend in the horizontal direction. In certain aspects, a camera aperture region of the display includes the transparent conductive interconnections and remaining portions of the display include non-transparent conductive interconnections that electrically couple other pixel groups of the display.

In some implementations, the camera aperture region includes portions of the display through which light that directly passes through is sensed by the camera. In some aspects, the device does not include a polarizer above the display. In certain aspects, a pixel density of a camera aperture region of the display is lower than a pixel density of remaining portions of the display. In some implementations, the pixel groups are arranged in a diamond pattern.

In some implementations, the camera includes a top barrel diameter that is less than a diameter of an image sensor in the camera. In certain aspects, each of the pixel groups is in a shape with rounded edges. In some aspects, each of the pixel groups is in a shape that is a square. In some implementations, each of the pixel groups includes one red pixel, one blue pixel, and two green pixels.

Details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
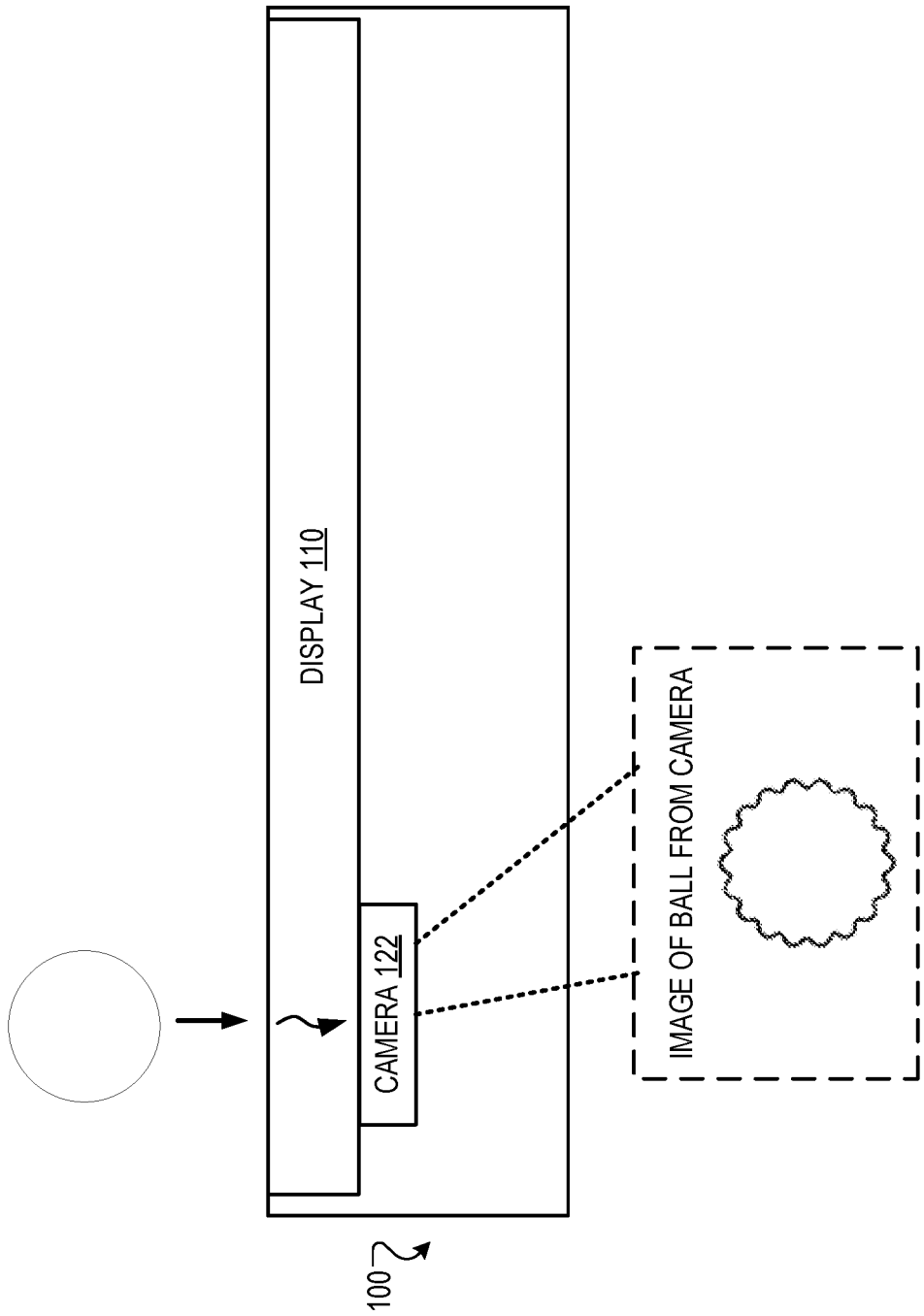
FIG. 1 is conceptual diagram of a device that reduces image quality degradation caused by a display over a camera.

FIG. 1 is conceptual diagram of a device 100 that reduces image quality degradation caused by a display over a camera. The device 100 includes a display 110 and a camera 122. The display 110 is positioned above the camera 122 such that light that is sensed by the camera 122 to generate images passes through the display 110. For example, the camera 122 may have a view of a scene that includes a ball, light that reflects off the ball may pass through the display 110, the light that passes through the display 110 may then be sensed by the camera 122, and the camera 122 may then generate an image based on the light sensed by the camera.

FIG. 1 shows that the image of the ball generated by the camera 122 still has some image degradation shown by the edges of the ball in the image which are fuzzier than the actual edges of the ball. For example, a wavy line that passes through the display 110 to the camera 122 indicates how the light may experience interference from the display 110 which results in image degradation.

Generally, a display over a camera may cause image degradation through light diffraction, light reflection, and transmission loss. Light diffraction may be due to very small display pixel features like gaps between pixel and gaps between interconnections that connect the pixels. Light diffraction may result in image resolution loss and contrast reduction, e.g., by a layer of haze.

Light reflection may be due to highly reflective material like metal interconnections. The image quality impact may be a ghost image and image flare. Transmission loss may be due to a dense pixel structure, e.g., pixel, metal interconnections, etc., on top of the camera that blocks light from reaching the camera.

Transmission loss may result in a significant reduction in the effective camera aperture. A reduction in the effective camera aperture may impact image quality through image signal to noise reduction, which may cause further resolution reduction and increase in image noise, i.e. grainy image.

The device 100 may reduce light diffraction through different ways. First, the device 100 may include transparent conductive material as display pixel interconnections. For example, the device 100 may use transparent conducting film made of indium tin oxide to electrically connect pixels. The transparent conductive material may be used globally across the entire display 110.

In another implementation, the transparent conductive material may be used for interconnections locally on portions of the display 110 through which light that reaches the camera 122 can pass, the portions also referred to as the camera aperture region, and metal interconnections can be used for other portions of the display 110. For example, where the camera lens has a diameter of one millimeter, is one millimeter from an outer surface of the display 110 facing out of the device 110, and captures light at up to a forty five degree angle, the camera aperture region of the display 110 may be a circular portion of the display 110 centered directly above the center of the camera lens and with a diameter of two millimeters. Use of transparent conductive material for interconnections is described in more detail below in regards to FIG. 2.

Second, the device 100 may reduce pixel density locally to increase pixel pitch size. For example, the display 110 may have a lower pixel density for the camera aperture region of the display 110 compared to other regions of the display 110. Reducing the pixel density locally may result in a bigger effective camera aperture.

Third, the device 100 may have pixel locations locally organized to maximize the camera aperture size. For example, the display 110 may organize pixels in the camera aperture region of the display 110 in a diamond pattern at one hundred eleven pixels per inch instead of a grid pattern at two hundred twenty two pixels per inch used in remaining regions of the display 110.

Fourth, the device 100 may have pixels that are organized in a random pattern. Randomizing pixels may result in a diffraction pattern that appears as random noise instead of structure noise. Human vision may be much less sensitive to random noise than structure noise.

The device 100 may reduce light diffraction through different ways. First, the non-reflective material may be used to cover the bottom and sides of pixels in the display. For example, black non-reflective masks may be applied to the bottom and sides of pixel groups to shield light from reflecting off the bottom and the sides. Using non-reflective material to cover pixels is described in more detail below in regards to FIG. 3.

Second, the device 100 may include transparent conductive interconnections instead of metal routing traces. For example, as described above in regards to reducing light diffraction, the interconnections between pixels may be made of transparent conducting film.

The device 100 may reduce transmission loss through different ways. First, the display 110 may use lower pixel density in the camera aperture region and higher pixel density in remaining regions of the display 110. Using a lower pixel density in the camera aperture region may increase the effective camera aperture size.

Second, the camera 120 may include a camera lens with a top barrel diameter that reduces a size of the camera aperture region. For example, the top barrel diameter of the camera lens may be less than a diameter of the image sensor in the camera. Reducing the size of the camera aperture region may reduce the impact to a user in having lower pixel density in the camera aperture region of the display 110.

Third, the device 100 may not have a polarizer on top of the display 110. Omitting the polarizer may result in around fifty percent more light transmission to the camera 120 over including the polarizer. Fourth, the device may use a camera lens with a low F-number to capture more light. The F-number refers to the ratio of the camera's focal length to the diameter of an entrance pupil of the camera. Fifth, the camera 120 may include an image sensor with large pixel sizes to increase camera sensitivity compared to an image sensor with smaller pixel sizes.

The device 100 may use one or more of the ways to light diffraction, light reflection, and transmission loss. For example, the device 100 may include only the first and second way to reduce light diffraction and the third way to reduce transmission loss. In another example, the device 100 may include all of the ways described above to reduce light diffraction, light reflection, and transmission loss. In yet another example, the device 100 may use only the first way to reduce light diffraction and first and second way to reduce light reflection.

Figure 2:
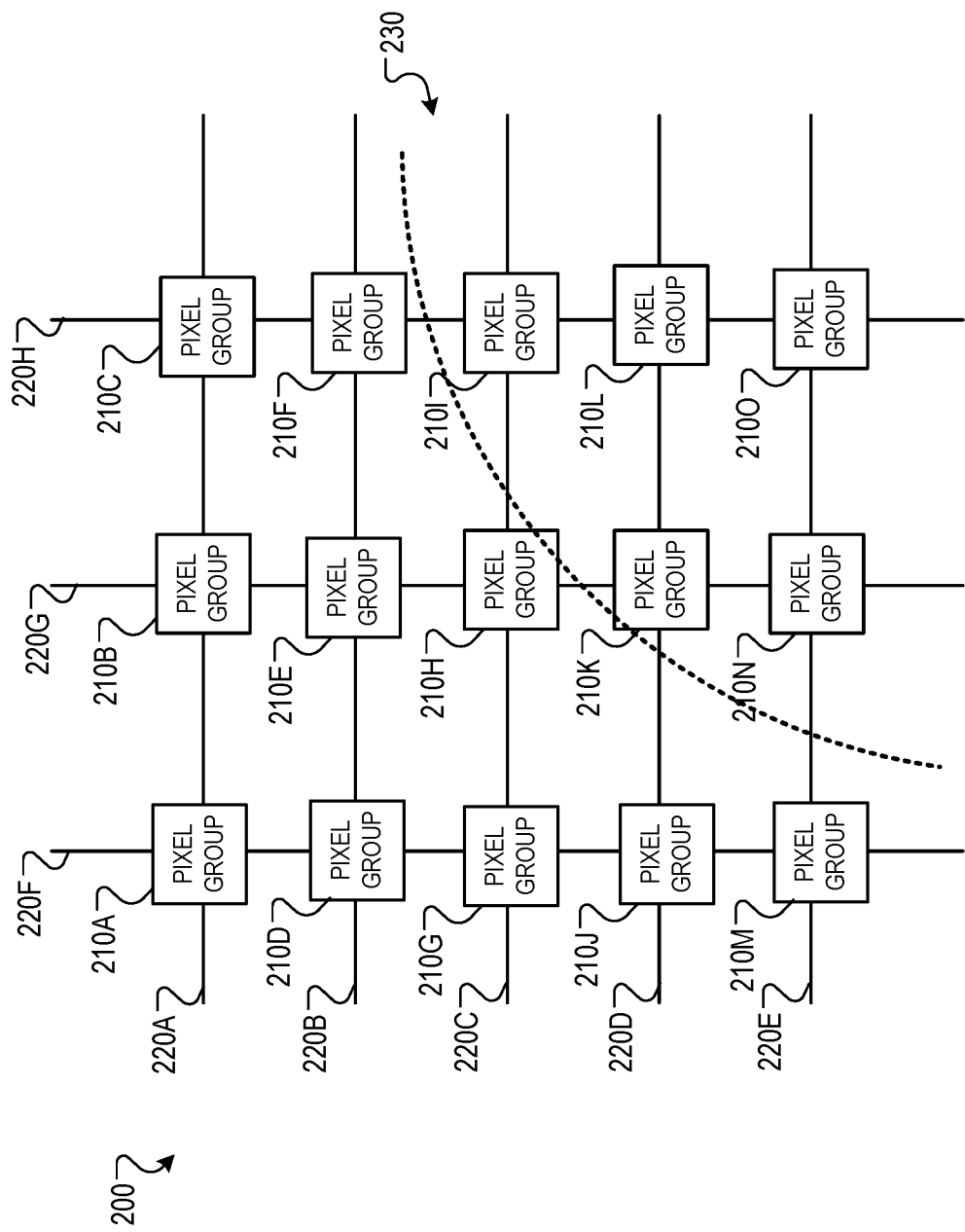
FIG. 2 is a conceptual diagram of a display that includes transparent conductive interconnections to reduce image quality degradation.

FIG. 2 is a conceptual diagram of a display 200 that includes transparent conductive interconnections to reduce image quality degradation. The display 200 may be the display 110 shown in FIG. 1 or may be a different display. As shown in FIG. 2, the display 200 includes pixel groups 210A-210O that are electrically coupled together by interconnections that extend in a horizontal direction 220A-E and interconnections that extend in a vertical direction 220F-H.

As shown in FIG. 2, pixel groups 210I, 210K, 210L, 210N, and 210O are included in a camera aperture region 230 and the remaining pixel groups are not included in the pixel group. As light that passes through the camera aperture region 230 may fall on the image sensor of the camera, the interconnections for the pixel groups 210I, 210K, 210L, 210N, and 210O may be made of transparent conductive material so that light diffraction and light reflection from the interconnections is reduced. The remaining interconnections may be metal as light diffraction and light reflection from interconnections not in the camera aperture region 230 are unlikely to be sensed by a camera. Alternatively, all the interconnections of the display 200 may be formed with a transparent conductive material.

Each pixel group may include a single red pixel that displays red, a single blue pixel that displays blue, and two green pixels that display green. However, the display 200 may include pixel groups with pixels that display different colors and different numbers of each color pixel.

Figure 3:
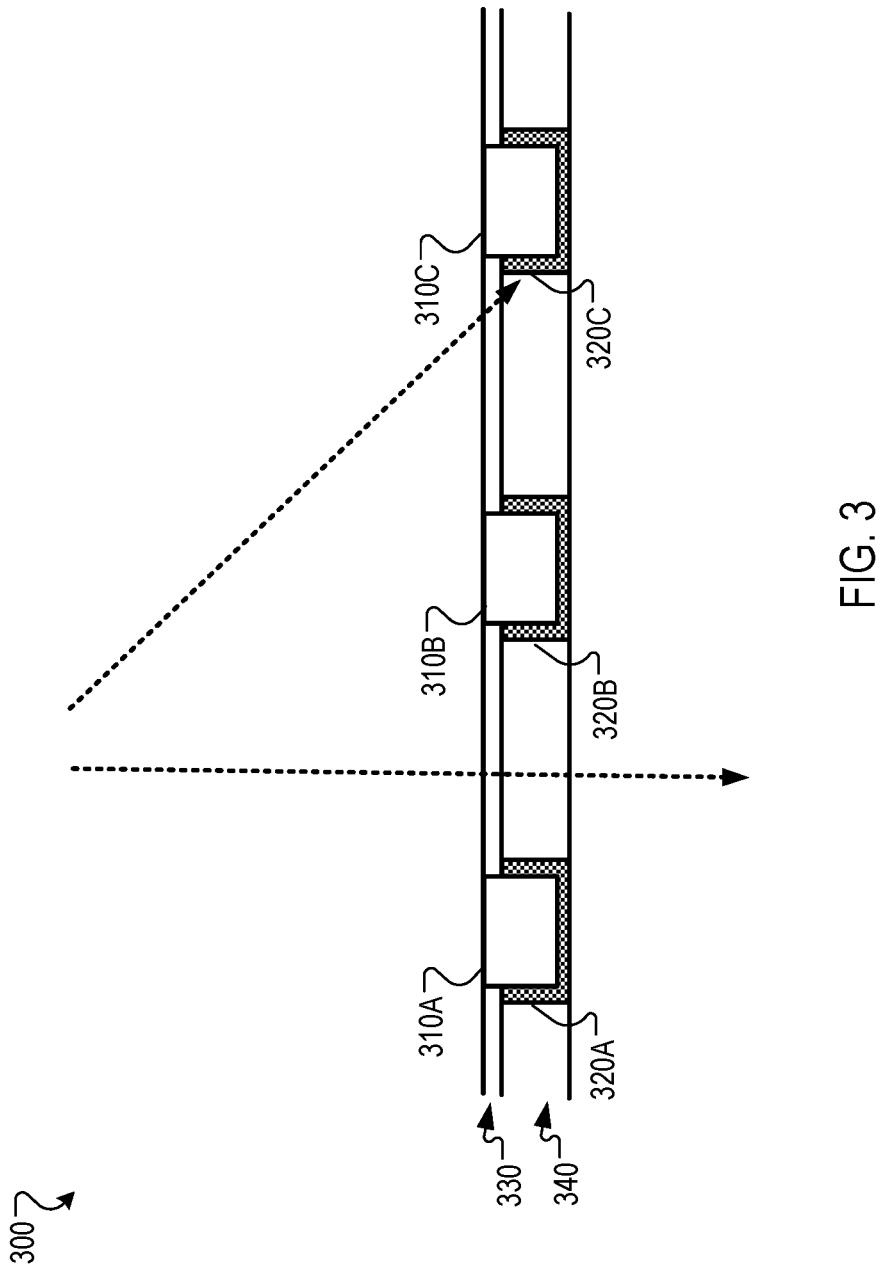
FIG. 3 is a conceptual diagram of a display that includes non-reflective material to reduce image quality degradation.

FIG. 3 is a conceptual diagram of a display 300 that includes non-reflective material to reduce image quality degradation. The display 300 may be the display 110 shown in FIG. 1 or may be a different display. As shown in FIG. 3, the display includes a substrate 340 that holds pixel groups 310A-C in place, non-reflective material 320A-C that covers the bottom and four sides of corresponding pixel groups, and an interconnection 330.

FIG. 3 illustrates how light that is incident on the non-reflective material 320C is not reflected further to a camera beneath the display 300 while light that is not incident on non-reflective material does pass through the display 300 to the camera. The non-reflective material 320A-C may be material that is colored black. Material that is colored black may reflect less light than material that is another color. Additionally or alternatively, the non-reflective material 320A-C may absorb 70%, 80%, 90%, or some other amount of light incident on the non-reflective material 320A-C.

The bottom of a pixel group may refer to a part of the pixel group facing a camera, and sides of the pixel group may refer to a part of the pixel group that faces other pixel groups. The sides of each of the pixel groups extends in a vertical direction from the bottom of the pixel group. The vertical direction may refer to the direction that extends from the camera to a surface of the display.

The sides of each of the pixel groups may be entirely covered with non-reflective material. Alternatively, a portion of each of the sides of the pixel group may be covered by non-reflective material. For example, the portion of the sides of the pixel groups 310A-C that is below the interconnection 330 may be covered but the portion of the sides that is not below the interconnection 330 may not be covered.

Figure 4:
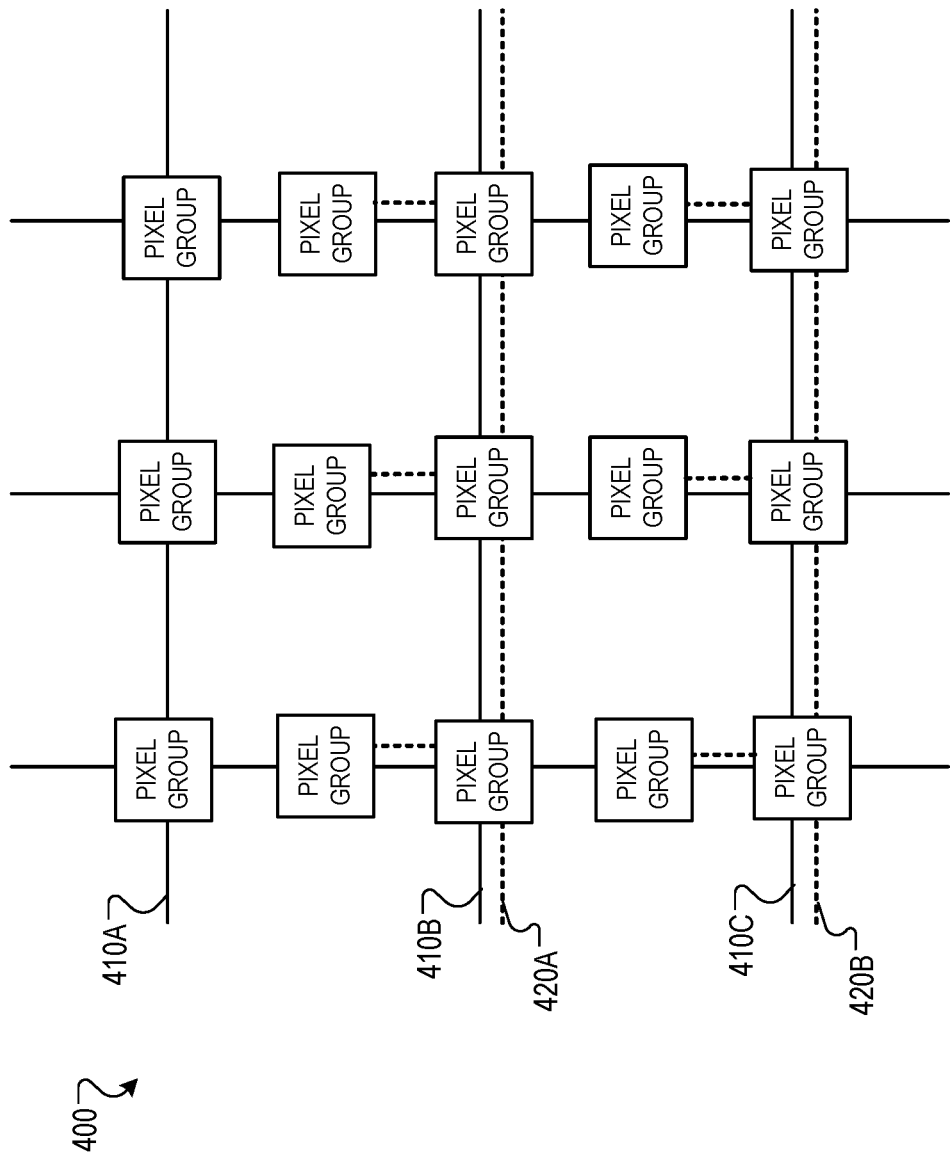
FIG. 4 is a conceptual diagram of a display that includes interconnections arranged to reduce image quality degradation.

FIG. 4 is a conceptual diagram of a display 400 that includes interconnections arranged to reduce image quality degradation. The display 400 may be the display 110 shown in FIG. 1 or may be a different display. The display 400 includes pixel groups arranged such that rows of the pixel groups alternate between including interconnections that extend in a horizontal direction 410A-C, also referred to as horizontal interconnections, which electrically couple pixel groups in the row and not including horizontal interconnections that extend in a horizontal direction.

Each of the rows of pixel groups that do not include horizontal interconnections are instead coupled by both a horizontal interconnection through a row that already includes a horizontal interconnection and vertical interconnections to the row that already includes the horizontal interconnection. The horizontal and vertical interconnections for the rows of pixel groups that do not include horizontal interconnections are represented by the dotted lines 420A, 420B.

Arranging the interconnections to skip every other row results in larger apertures between pixel groups. For example, as shown in FIG. 1 apertures are formed between groups of four pixel groups, while in FIG. 4, apertures are formed between groups of six pixel groups. Additionally or alternatively, in some implementations the pixel groups may have rounded corners and/or be square shaped to reduce a size of each pixel group.

Similarly to as described above, in some implementations, arranging the interconnections to skip every other row may be done for only rows that include pixel groups in a camera aperture region. In other implementations, arranging the interconnections to skip every other row may be done for globally across the entire display 400.

Additionally or alternatively, in some implementations, a display may include pixel groups arranged such that columns of the pixel groups alternate between including interconnections that extend in a vertical direction, also referred to as vertical interconnections, which electrically couple pixel groups in the column and not including vertical interconnections that extend in a vertical direction.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, though particular embodiments of the subject matter have been described. These, and other embodiments, may fall within the scope of the following claims.

What is claimed is:

1. A device comprising:
   a display that includes pixel groups,
      wherein a bottom and sides of each of the pixel groups are covered with non-reflective material,
      wherein the pixel groups are electrically coupled together with transparent conductive interconnections; and
   a camera located beneath the display, wherein the camera is configured to sense light that passes through the display.

2. The device of claim 1, wherein the sides of each of the pixel groups that extend in a vertical direction from the bottom are entirely covered with the non-reflective material.

3. The device of claim 1, wherein each of the pixel groups includes four sides that extend in the vertical direction.

4. The device of claim 1, wherein the non-reflective material is colored black.

5. The device of claim 1, wherein the non-reflective material absorbs at least 80% of light incident on the non-reflective material.

6. The device of claim 1, wherein the interconnections are arranged such that rows of the pixel groups alternate between including interconnections that extend in a horizontal direction and not including interconnections that extend in a horizontal direction.

7. The device of claim 1, wherein the interconnections are arranged such that columns of the pixel groups alternate between including interconnections that extend in a vertical direction and not including interconnections that extend in a vertical direction.

8. The device of claim 1, wherein the interconnections are arranged such that pixel groups in a row without interconnections that extend in the horizontal direction are electrically coupled together by interconnections that extend in a vertical direction from pixel groups in rows with interconnections that extend in the horizontal direction to the pixel groups in the row without interconnections that extend in the horizontal direction.

9. The device of claim 1, wherein a camera aperture region of the display includes the transparent conductive interconnections and remaining portions of the display include non-transparent conductive interconnections that electrically couple other pixel groups of the display.

10. The device of claim 9, wherein the camera aperture region comprises portions of the display through which light that directly passes through is sensed by the camera.

11. The device of claim 1, wherein the device does not include a polarizer above the display.

12. The device of claim 1, wherein a pixel density of a camera aperture region of the display is lower than a pixel density of remaining portions of the display.

13. The device of claim 1, wherein the pixel groups are arranged in a diamond pattern.

14. The device of claim 1, wherein the camera includes a top barrel diameter that is less than a diameter of an image sensor in the camera.

15. The device of claim 1, wherein each of the pixel groups is in a shape with rounded edges.

16. The device of claim 1, wherein each of the pixel groups is in a shape that is a square.

17. The device of claim 1, wherein each of the pixel groups includes one red pixel, one blue pixel, and two green pixels.

* * * * *